United States Patent Office 2,773,029
Patented Dec. 4, 1956

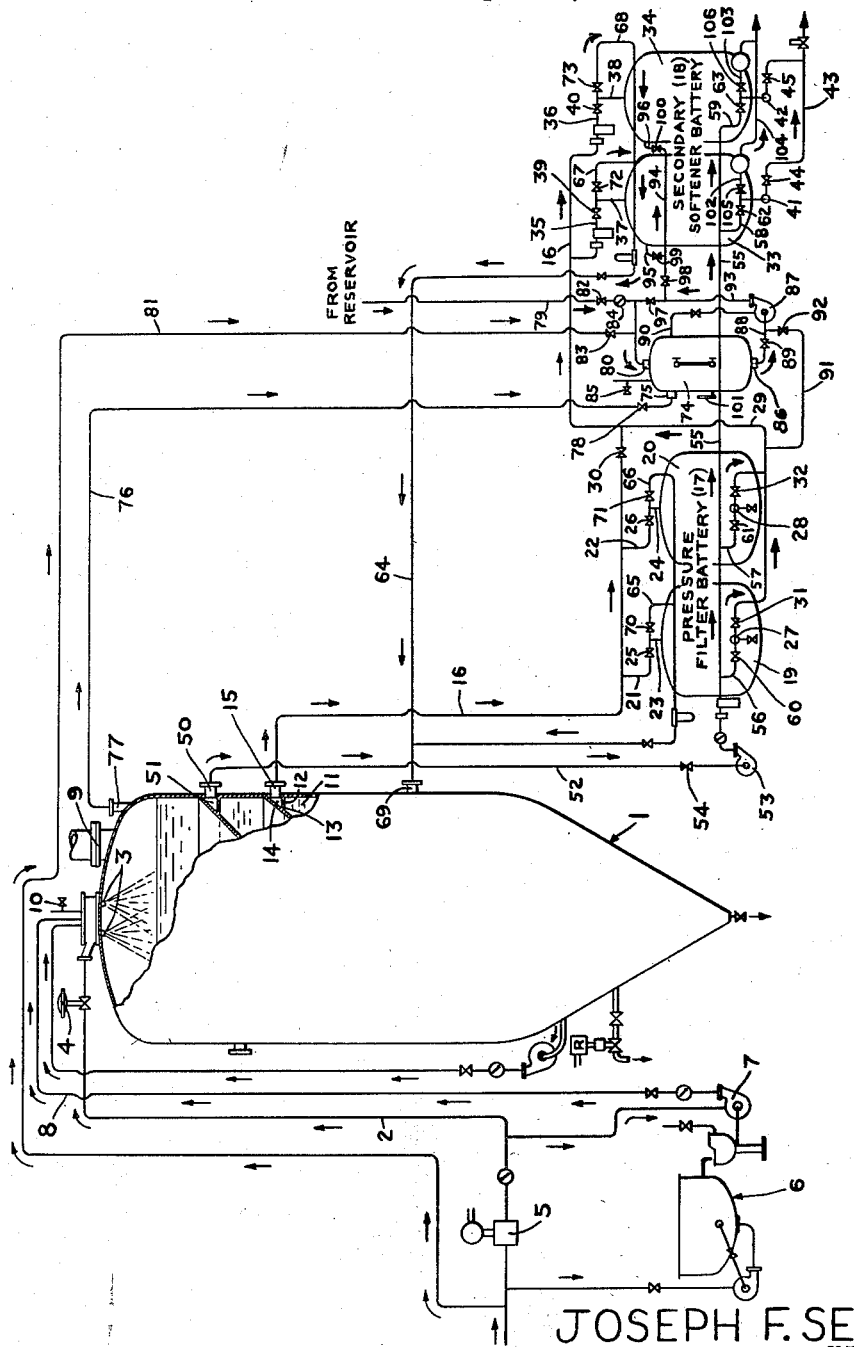

2,773,029

WATER TREATING SYSTEM

Joseph F. Sebald, Bloomfield, N. J., assignor to Worthington Corporation, Harrison, N. J., a corporation of Delaware Application April 16, 1954, Serial No. 423,579

9 Claims. (Cl. 210—16)

This invention relates generally to water treating systems and more particularly to a system wherein means are provided for deaerating and heating the regenerant solution for the secondary softening medium; the same means being adapted for the gradual preheating to normal operation temperature of the secondary softening medium, and wherein the unsaturated and unused regenerant solution remaining in said means can be returned to the regenerant solution supply tank for resaturation after the regeneration of the secondary softening means is complete.

To meet each specific industrial or other type of operation in which treated water is required, a hot process water treating system now usually includes a water treating tank through which the raw water is passed when it undergoes chemical reaction, a filter bank through which the treated water is passed for filtering out particles of slurry and other miscellaneous suspensions, and a secondary softening means for reducing the hardness content of the water to an infinitely small value by passing the water therethrough before it goes to service use.

The secondary softening means in more recent years consists of one or more tanks through which the water is passed by gravity flow which contains a bed of ion-exchange material such as "Zeolite." This Zeolite has the chemical property of being able to reduce the hardness even in treated water down to as low as 1 p. p. m. in a single pass therethrough.

When the chemical property of such ion-exchange material is used up after a period of operation, as is well known in the art, the material must be regenerated. In addition, it has been found that these materials must be handled with a certain degree of caution especially when starting up to avoid the effect of thermal strain, the fragile nature of these materials causing them to crack and crumble under such strains thereby reducing their efficiency.

The present invention covers in a water treating system; a regenerant system including a direct contact, non-deaerating type, heater and a coacting recirculating pump, adapted for mixing, preheating and deaerating the regenerant solution prior to regeneration of the ion-exchange materials; and for deaerating and preheating of raw water delivered to the direct contact heater and for gradually feeding the same to the secondary softening means until it is brought up to normal operating temperature of the water treating system in which it functions; the pump further acting to pass the regenerant solution to the tanks holding the ion-exchange material or to return unused and unsaturated regenerated solution to the regenerant supply tank.

Accordingly, it is an object of the present invention to provide a regenerant arrangement for a water treating system in which the regenerant solution will be deaerated and preheated before use.

It is another object of the present invention to provide means for gradually bringing the ion-exchange softening medium to operational temperature without thermal shock.

It is a further object of the present invention to provide means for returning unused and unsaturated regenerant solution back to the regenerant solution source for saturation and reuse.

With these and other objects in view, as may appear from the accompanying specification, the invention consists of various features of construction and combination of parts, which will be first described in connection with the accompanying drawing, showing a diagrammatic flow and equipment sketch of a hot process water treating system of a preferred form embodying the invention, and the features forming the invention will be specifically pointed out in the claims.

Referring more particularly to the drawings, Figure 1 shows a hot process deaerating type water softener 1, which may be any suitable type, of which there are several well known on the open market such as those described in my prior issued Patents Nos. 2,427,422 and 2,379,753.

Raw water is led to the main or primary water softener 1 from any suitable source (not shown) through a raw water conduit 2 which is connected to spray valves 3 disposed at the upper end of the water softener 1. A pressure operated diaphragm valve 4 in the raw water conduit 2 actuated by the level of treated water in the water softener 1 regulates the flow of water to the softener.

A metering device 5 in the raw water conduit coacts with and regulates the chemical feed system generally designated 6 which mixes and delivers suitable quantities of chemical solution for water softening by means of pump 7 and chemical feed conduit 8 to the upper end of the water softener 1 so as to be joined with the raw water sprayed from the spray valves 3 and to fall by gravity flow therewith.

The incoming raw water and chemical mixture will be heated simultaneously by direct heat exchange relation with steam conducted to the steam inlet 9 from a suitable source (not shown), the steam condensate joining with the raw water and delivered therewith. Released oxygen and non-condensible gases will be vented through the venting means 10 to atmosphere.

The heated raw water and chemical solution mixture will interact as it passes downwardly through the water softener 1 and will reach the storage portion 11 thereof as treated water passing uniformly through the spaced axial opening 12 in baffle 13 to a discharge chamber 14 whence it passes outwardly through the treated water discharge outlet 15 into the main treated water conduit 16, all of which is clearly shown in the drawing. It will be understood that while the present type of water softener is shown and described that any type of water softener may be used, hence the relative positions of the inlet and outlet connections on the water softener will vary depending on the particular type used without departing from the spirit of the invention.

Under the normal service conditions the treated water is passed to a pressure filter means and thence through a secondary softener, as shown in the present invention, to the pressure filter battery 17 and secondary battery 18, it being understood that while two or more units are shown in a "battery," that one unit may be utilized without departing from the spirit of the invention. The common practice of two units being adapted to facilitate necessary cleaning or regeneration of a unit without stopping the operation of the entire water treating system.

The water after being treated in the secondary softener battery 18 will be passed to service use, such as boiler feed water, etc.

It is further pointed out that unless otherwise indicated the valves related to the movement of water in the system are generally manually operated and may be any suitable type such as globe valves easily purchasable on the open market.

Pressure filter battery

The pressure filter battery 17 will include a filter or filters comprising a tank with filtering material therein, of any suitable type of which there are many easily purchasable on the open market, into which the treated water can be passed by means of connecting conduits 21 and 22 connected to filter inlet means 23 and 24. Suitable filter service valves 25 and 26 in the connecting conduits are opened and closed to direct the flow of treated water into one or the other of the filters which is in service use.

The lower end of the filters 19 and 20 are each provided with filter outlets 27 and 28 in turn connected to a common bypass conduit 29 which is connected to the main treated water conduit 16 at a point beyond a by-pass valve 30 normally maintained closed when the system is in service operation. Thus the treated and filtered water is prevented from intermixing but the filter battery can be bypassed when necessary in connection with the operation of the system.

Each of the filter discharge outlets 27 and 28 is provided with a filter service outlet valve 31 and 32 which is operated to control the flow of water from its respective filter to the bypass conduit 29, all of the above being clearly shown by the drawing.

Secondary softener battery

The filtered water in the main treated water conduit 16 beyond the bypass valve 30 is next passed in normal service operation to the secondary softener battery 18 which will include a softener or as shown softeners 33 and 34 comprising a tank with water softening material such as "Zeolite" therein, of any suitable type of which there are many easily purchasable on the open market, by connecting conduits 35 and 36 connected between the main treated water conduit 16 and the respective softener inlet means 37 and 38.

Suitable softener inlet valves 39 and 40 in the connecting conduits 35 and 36, are opened and closed to direct the flow of filtered water through one or the other of the softeners.

The lower end of the softeners 33 and 34 are each provided with softener outlets 41 and 42 in turn connected to a common service conduit 43 which leads to the point where the now treated, filtered and softened water will be placed into industrial use.

Each of the softener outlets 41 and 42 is provided with a softener service outlet control valve 44 and 45 which is operated to control the flow of treated, filtered, softened water from its respective softener to the common service conduit 43, all of which is clearly shown by the figure showing the invention.

It is customary procedure during normal service operation to use only one of the filters and one of the softeners at a time. The filter not in use will then be cleaned and the softener not in use will be cleaned and regenerated at some time during the period. For this purpose a backwash system for backwashing the filters and the softeners and a regenerating system for regenerating the secondary softeners alone are provided.

Backwash system

The backwash system is common to both the filter battery 17 and the secondary softener battery 18, suitable valves being utilized to control the flow therethrough.

Thus, a wash water outlet 50 on the water softener 1 communicates with a wash water compartment 51 formed therein, having clean treated water therein. Wash water passes from the wash water compartment 51 through the outlet 50 to a wash water conduit 52 continuous therewith connected to the suction of a backwashing pump 53, the flow through said wash water conduit 53 to be controlled by a wash water valve 54 provided therein as shown in the drawing.

The backwashing pump 53 has its discharge connected to a common backwash line 55, in turn connected by backwash connecting conduits 56 and 57 to the filter outlets 27 and 28 respectively and connecting conduits 58 and 59 to the secondary softener outlets 41 and 42 respectively, each of said connecting conduits 56, 57, 58 and 59 to be opened and closed by backwash control valves 60, 61, 62 and 63 thereon so that when the backwashing pump 53 is in operation wash water can be pumped through the common backwash line 55 into the connecting conduits which are opened by operation of the control valves 60, 61, 62 and 63.

When wash water enters either of the filters 19 and 20 or secondary softeners 33 and 34, it will be displaced upwardly, cleansing the filter or softener by its rinsing action. This wash water is then led back through suitable conduits hereinafter described and will be retreated and passed to service in the manner above described.

Thus, when one or the other of the filters or the secondary softeners are in operation, the remaining filter and softener will have the service valve 25 or 26 and 39 or 40 closed thereon and can thus receive the wash water therein.

The used wash water from the filters is led to a common wash water return line 64 through wash water connecting conduits 65 and 66 connected between the common wash water return line 64 and the respective inlets 23 and 24 on the filters 19 and 20 and wash water connecting conduits 67 and 68 connected between the common wash water return line 64 and the respective inlets 37 and 38 on the secondary softeners 33 and 34. The wash water is led through the common wash water return line 64 back to the common wash water return inlet 69 on the water softener 1 where it joins the incoming raw water in the main softener 1, and is retreated therewith. Suitable wash water valves 70, 71, 72 and 73, will control the return flow of wash water from the filters and secondary softeners.

Regenerating system

The secondary softeners 33 and 34 are of the general type which have gained wide acceptance in the water treating field. As is known, however, the capacity of the ion-exchange material to produce the desired result becomes "exhausted" and in order to return it to its original composition for reuse again and again, it must be regenerated under conditions which produce minimum depreciation of the capacity of the material being used.

The more general type of ion-exchange materials utilized will require replacement of the accepted sodium ions to render the material satisfactory again to produce the desired condition of the water for service. Such type replacement can be accomplished by bathing the ion-exchange material in a solution of sodium chloride which solution is called in the art a "brining solution."

The abovementioned replacement cycle is called the "sodium cycle" type of regeneration. It will be understood that such preferred illustration is merely illustrative of only one of the several types of cycles that are possible. For example, "alkalinity" can be removed by regeneration with an acid solution. Sulphate and chloride ions can be regenerated with a sodium carbonate solution in conjunction with an acid cycle exchanger etc., and therefore the use of other cycles will not depart from the spirit of the present invention nor affect the application thereof to these other solutions.

Accordingly, referring to the drawing, a direct contact regenerating heater tank 74 is provided with a steam inlet 75 which is connected by steam conduit 76 to a steam outlet 77 in the main softener 1 so that steam flows from the source (not shown) to the main softener 1 and thence through the conduit 76 to the direct contact heater 74 when the steam control valve 78 which controls the flow thereto is open.

The direct contact heater 74 may be of any approved type easily purchasable on the open market. It is normally not utilized as a deaerator, however, in the present arrangement in addition to acting as a mixing, storage and heating unit, for "brining solution," it also acts to deaerate as is hereinafter described.

Concentrated sodium chloride solution from a suitable reservoir (not shown) is led by conduit 79 to an inlet 80 at the upper end of the direct contact heater 74. Raw water supplied to the concentrated sodium chloride solution to dilute it for regeneration as required, is supplied by a supplementary raw water conduit 81 connected between the main raw water inlet line 2 and the conduit 79 just before it enters the inlet 80. Suitable control valves 82 and 83 are provided in the respective conduits 79 and 81 to control the flow to the direct contact heater 74, all of which is clearly shown in the drawing.

A volumetric rate flow indicator 84 is provided in line 79 to determine the quantity of concentrated sodium chloride flowing from the reservoir (not shown) to the direct contact heater 74.

Thus when the control valves 78, 82 and 83 are open sodium chloride solution will flow into said direct contact heater 74 and be brought into direct contact with the incoming steam where it is heated releasing the oxygen and non-condensible gases therein, the condensate formed being stored in the lower or storage portion of the direct contact heater for use as regenerant solution. A vent assembly 85 is provided on the direct contact heater 74 to vent these released gases to atmosphere.

The lower or storage end of the direct contact heater 74 is provided with a discharge outlet 86 which is connected to the suction of a pump 87 by means of connecting conduit 88, a control valve 89 therein to control the flow of regenerant solution from the direct contact heater 74 to the pump 87. A priming line 90 is also provided for the pump 87 which bypasses back to the upper end of the direct contact heater 74.

The suction of the pump 87 is also connected to the treated water bypass conduit 29 by a connecting conduit 91, having the flow therethrough controlled by a valve 92 so that when it is desired to pump treated water as hereinafter described by suitably controlling the valve members 31 and 32 and 92, treated water can be conducted to the pump 87 for use in the regeneration system as desired.

The figure further shows that the discharge of the pump 87 is connected by recirculating conduit 93 to the source conduit 79 for the concentrated sodium chloride solution and by regenerant conduit 94 to one end of the respective connecting conduits 95 and 96 which are in turn connected at their other ends to the secondary softeners 33 and 34. Suitable control valves 97, 98, 99 and 100 in the respective conduits 93, 94, 95 and 96 are provided to direct and control the flow of regenerant fluid therethrough.

The secondary softeners 33 and 34 pass used regenerant solution through the outlets 41 and 42 respectively, and waste regenerant solution connecting conduits 102 and 103 to a common waste conduit 104 which leads the used regenerant solution to a suitable disposal point. The usual waste regenerant solution control valves 105 and 106 are provided for the conduits 102 and 103 to control the flow therethrough.

This construction allows the pump 87 to perform several functions in the regeneration system; first it can recirculate the regenerant solution until it is brought up to the operating temperature before use as indicated by the thermometer 101 provided on the direct contact heater 74; second, it can add treated water to the concentrated sodium chloride solution instead of raw water by closing supplementary raw water valve control 83 and opening the valves 31 or 32 and 92; third, it can lead regenerant solution to the respective secondary softeners 33 and 34 through the conduits 94, 95 and 96 when their respective valves 98, 99 and 100 are adjusted as desired to control the flow; fourth, it can return unused regenerant solution to the reservoir by adjusting the control valves 83 or 92, 97 and 98 accordingly, and fifth, it can recirculate raw or treated water and pass it to the secondary softeners 33 and 34 to slowly bring up the softeners to the operational temperature during the starting up process.

*Operation*

The regeneration system above described performs three main functions (1) preheating of the secondary softeners before putting them into service use, (2) regeneration of one or the other of the softeners as desired, and (3) repumping of unused regenerant solution back to the reservoir (not shown).

Thus in starting up, all valves are normally closed. The secondary softener 33 or 34 which is to be placed in service is brought to temperature by circulating pretreated water therethrough. This is done by circulating raw or treated water by pump 87 through the direct contact heater 74 by means of lines 88, 93 and 79 connected thereto until by stages it is passed in its heated condition to warm up the desired secondary softeners. The control valves 98, 99 or 100 and 105 or 106 being adjusted for the desired results.

After the desired softener 33 or 34 reaches operating temperature all valves are closed, and then the various service control inlet and outlet valves on the filters and softeners to be used are opened and the unit will pass treated, filtered and softened water through line 43 to service.

When it is desired to backwash or regenerate either of the filters or softeners not in use, the pumps 53 or 87 are employed, as above described. Normal service operation can of course continue undisturbed during these processes.

While one form of the invention has been illustrated and described it is obvious that those skilled in the art may vary the details of construction and it will be understood that the invention is therefore not to be limited to this specific construction or arrangement of parts shown but that they may be widely modified within the invention defined by the claims.

What is claimed is:

1. The method of bringing the ion exchange type secondary softener battery of a precipitating type water softening system up to operating temperature which consists in simultaneously passing steam and water to a direct contact heater, recirculating the water through said heater to heat and to deaerate the water, delivering the preheated and deaerated water to said secondary softener battery to gradually heat the ion exchange material therein up to operating temperature, and passing the cooled water from said secondary softener battery to waste.

2. The method of bringing the ion exchange type secondary softener battery of a precipitating type water softening system up to operating temperature as claimed in claim 1 wherein the water delivered to the direct contact heater has been treated and filtered.

3. The method of regenerating an ion exchange type secondary softener battery of a precipitating type water softening system which consists in simultaneously passing steam, water and concentrated regenerant solution to a direct contact heater independently of each other, recirculating the mixture of water and concentrated regenerant solution through said direct contact heater to deaerate said mixture and to bring it up to regenerating temperature, passing the preheated and deaerated mixture to the secondary softener battery to regenerate the ion exchange material therein without thermal strain, and passing the used mixture from said secondary softener battery to waste.

4. The method of regenerating an ion exchange type secondary softening battery of a precipitating type water softening system which consists in simultaneously passing steam, water and concentrated regenerant solution to a direct contact heater independently of each other, recirculating the mixture of water and concentrated regenerant solution through said direct contact heater to deaerate said mixture and to bring it up to regenerating temperature, passing the preheated and deaerated mixture to the secondary softening battery to regenerate the ion exchange material therein without thermal strain, passing the used regenerant mixture from said secondary softener battery to waste, and returning unused regenerant mixture from said direct contact heater to the source for concentrated regenerant solution.

5. In a water treating system the combination with a secondary softener battery having ion exchange or the like type softening material therein to receive the treated and filtered water and to pass the same to service, of a direct contact heater connected to a source of steam and a source of water, means connected to said direct contact heater for recirculating water therethrough to heat and to deaerate said water, conduit means to connect said recirculating means to said secondary softener battery for delivering preheated and deaerated water thereto to bring the ion exchange material in said secondary softener battery up to operating temperature when starting up, valve means in said conduit means for controlling the flow of said water from the direct contact heater to said secondary softener battery, and said secondary softener battery having outlets therein for passing said preheated and deaerated water to waste.

6. In a water treating system the combination with a secondary softener battery having ion exchange or the like type softening material therein to receive the treated and filtered water and to pass the same to service, of a direct contact heater connected to a source of steam, means connecting a source of water and a source of concentrated regenerant solution to said direct contact heater, valve means in said connecting means to control the flow of said water and regenerant solution to form a regenerant mixture for regeneration of the ion exchange material in said secondary softener battery, means connected to said direct contact heater to recirculate said mixture therethrough to preheat and deaerate the mixture, conduit means connecting said recirculation means to said secondary softener battery to pass preheated and deaerated regenerant mixture to said secondary softener battery for regenerating the ion exchange material therein without thermal strain, and valve means in said conduit means to control the flow of said mixture to said secondary softener battery, and said secondary softener battery having outlets to pass used regenerant mixture to waste.

7. In a water treating system as claimed in claim 6 wherein said recirculation means is connected to said source of concentrated regenerant solution to return unused regenerant mixture from said direct contact heater to said source of concentrated regenerant solution.

8. In a water treating system the combination with a filter battery to filter treated water therethrough and a secondary softener battery having ion exchange or the like type softening material therein to receive the treated and filtered water and to pass the same to service, of a direct contact heater connected to a source of steam, means connected to said direct contact heater for recirculating fluid therethrough to heat and deaerate said fluid, said recirculating means connected to said filter battery to provide a source of treated and filtered fluid for recirculation through said direct contact heater, conduit means connecting said recirculation means to said secondary softener battery for delivering preheated and deaerated fluid to said softener battery to bring the ion exchange material therein up to operating temperature when starting up, valve means in said conduit means to control the flow of said fluid from said direct contact heater to said secondary softener battery, and said secondary softener battery having outlets therein for passing said preheated and deaerated water to waste.

9. In a water treating system the combination with a filter battery to filter treated water therethrough and a secondary softener battery having ion exchange or the like type softening material therein to receive the treated and filtered water and to pass the same to service, of a direct contact heater connected to a source of steam, means connecting a source of concentrated regenerant solution to said direct contact heater having a metering means therein to control the flow of said concentrated regenerant solution to said direct contact heater, a recirculation means connected to said direct contact heater for recirculating fluid therethrough to heat and to deaerate said fluid, said recirculating means connected to said filter battery to provide a source of treated and filtered water for mixture with said concentrated regenerant solution in said direct contact heater to provide a regenerant mixture for regeneration of the ion exchange material in said secondary softener battery, conduit means connecting said recirculation means to said secondary softener battery for delivering the preheated and deaerated regenerant mixture from said direct contact heater to said secondary softener battery to regenerate the ion exchange material in said secondary softener battery without thermal strain, valve means in said conduit means to control the flow of said regenerant mixture from said direct contact heater to said secondary softener battery, and said secondary softener battery having outlets therein for passing said used regenerant mixture to waste.

References Cited in the file of this patent

UNITED STATES PATENTS

| Number | Name | Date |
| --- | --- | --- |
| 622,614 | Fleetwood | Apr. 4, 1899 |
| 753,860 | Destombes | Mar. 8, 1904 |
| 1,442,348 | McDermet | Jan. 16, 1923 |
| 1,895,635 | McDonald | Jan. 31, 1933 |
| 2,312,570 | Meier | Mar. 2, 1943 |
| 2,379,753 | Sebald | July 3, 1945 |
| 2,669,713 | Osmun | Feb. 16, 1954 |

FOREIGN PATENTS

| Number | Country | Date |
| --- | --- | --- |
| 23,706 | Great Britain | 1912 |

OTHER REFERENCES

Power Generation, vol. 53, No. 10, October 1949 pp. 75–76.

Gas World, May 31, 1947, pp. 688–691.